United States Patent
Gomes et al.

(10) Patent No.: US 7,113,328 B2
(45) Date of Patent: Sep. 26, 2006

(54) DUAL-WAVELENGTH PUMPED THULIUM-DOPED OPTICAL FIBER AMPLIFIER

(75) Inventors: Anderson Stevens Leonidas Gomes, Recife (BR); Michael Lee Sundheimer, Recife-PE (BR); Mariana Torres Carvalho, Camaragibe (BR); Joaquim Ferreira Martins-Filho, Recife (BR); Carmelo José Albanez Bastos-Filho, Recife (BR); Walter Margulis, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 369 days.

(21) Appl. No.: 10/385,876

(22) Filed: Mar. 10, 2003

(65) Prior Publication Data

US 2003/0231380 A1    Dec. 18, 2003

Related U.S. Application Data

(60) Provisional application No. 60/363,438, filed on Mar. 11, 2002, provisional application No. 60/365,133, filed on Mar. 14, 2002.

(51) Int. Cl.
*H04B 10/12*    (2006.01)

(52) U.S. Cl. .............................. 359/341.5; 359/341.31
(58) Field of Classification Search ............. 359/341.3, 359/341.31, 341.33, 341.5
See application file for complete search history.

(56) References Cited

U.S. PATENT DOCUMENTS

| | | | | |
|---|---|---|---|---|
| 5,136,420 A | * | 8/1992 | Inagaki et al. | 359/341.3 |
| 5,225,925 A | * | 7/1993 | Grubb et al. | 359/341.32 |
| 5,243,609 A | * | 9/1993 | Huber | 372/19 |
| 5,291,501 A | * | 3/1994 | Hanna | 372/6 |
| 5,710,786 A | * | 1/1998 | Mackechnie et al. | 372/6 |
| 5,933,437 A | * | 8/1999 | Delavaux | 372/6 |
| 6,407,853 B1 | | 6/2002 | Samson et al. | 359/341.31 |
| 6,476,960 B1 | * | 11/2002 | Traynor et al. | 359/341.31 |
| 6,501,596 B1 | * | 12/2002 | Inoue et al. | 359/341.5 |
| 6,628,883 B1 | * | 9/2003 | Wyatt et al. | 385/142 |
| 6,667,257 B1 | * | 12/2003 | Cole et al. | 501/37 |
| 6,721,092 B1 | * | 4/2004 | Aozasa et al. | 359/341.5 |
| 6,924,928 B1 | * | 8/2005 | Dennis et al. | 359/341.5 |
| 2002/0021882 A1 | * | 2/2002 | Wyatt et al. | 385/142 |

OTHER PUBLICATIONS

Sakamoto, Tadashi. "S-band Fiber Optic Amplifiers." NTT Photonics Laboratories. TuQ1-1.
Cole, Brian et al. "S-band Amplification in a Thulium Doped Silicate Fiber." Naval Research Laboratory, Optical Sciences Division, Code 5600. TuQ3-1.

(Continued)

*Primary Examiner*—Mark Hellner
*Assistant Examiner*—Eric Bolda (57) ABSTRACT

An arrangement and method provide an optical thulium doped fiber amplifier utilizing a dual wavelength pumping scheme for amplifying an optical signal. The method includes the steps of: a first deposition (a) of energy into the fiber amplifier by pumping with radiation of a first wavelength; and a second deposition (b) of energy into the fiber amplifier by pumping with radiation of a second wavelength. The radiation of the first wavelength is arranged to induce, by single photon absorption, a population to the $^3H_4$ level of the thulium dopant, and the radiation of the second wavelength primarily depopulates the $^3F_4$ level, by excited absorption of a single photon, preferably by strong excited state absorption to the $^3F_2$ level. The steps gives a population inversion between the $^3H_4$ and the $^3F_4$ levels and facilitate a power efficient high gain amplification.

25 Claims, 4 Drawing Sheets

OTHER PUBLICATIONS

Roy, Fabien et al. "Noise and Gain Band Management of Thulium-Doped Fiber Amplifier with Dual-Wavelength Pumping Schemes." IEEE Photonics Technology Letters, vol. 13, No. 8, Aug. 2001. 2001 IEEE.

Roy, Fabien, et al. "Novel Pumping Schemes for Thulium Doped Fiber Amplifier." Alcatel Corporate Research Center. 14/WA6-1.

Roy, Fabien et al. "Optimal Pumping Schemes for Gain-Band Management of Thulium-Doped Fiber Amplifiers." Alcatel Corporate Research Center. TuQ7-1.

Kasamatsu, Tadashi et al. "1.50-μm-Band Gain-Shifted Thulium-Doped Fiber Amplifier with 1.05- and 1.56-μm Dual-Wavelength Pumping." Optics Letters, vol. 24, No. 23. 1999 Optical Society of America. pp. 1684-1686.

Kasamatsu, T. et al. "Laser-Diode-Pumped Highly-Efficient Gain-Shifted Thulium-Doped Fiber Amplifier Operating in the 1480-1510-nm Band." System Devices and Fundamental Research, NEC Corp. TuQ4-1.

Roy, F. et al. "48% Power Conversion Efficiency in Single Pump Gain-Shifted Thulium-Doped Fibre Amplifier." Electronics Letters, vol. 37, No. 15. Jul. 2001. pp. 943-945.

Kasamatsu, T. et al. "Laser-Diode Pumping (1.4 and 1.56μm) of Gain-Shifted Thulium-Doped Fibre Amplifier." Electronics Letters, vol. 36, No. 19. Sep. 2000. pp. 1607-1609.

Kasamatsu, Tadashi et al. "Laser-Diode-Pumped Highly Efficient Gain-Shifted Thulium-Doped Fiber Amplifier Operating in the 1480-1510-nm Band." IEEE Photonics Technology Letters, vol. 13, No. 5. 2001 IEEE. pp. 433-435.

Kasamatsu, Tadashi et al. "Gain-Shifted Dual-Wavelength-Pumped Thulium-Doped Fiber Amplifier for WDM Signals in the 1.48-1.51-μm Wavelength Region." IEEE Photonics Technology Letters, vol. 13, No. 1. 2001 IEEE. pp. 31-33.

Roy, Fabien et al. "48% Power Conversion Efficiency in a Single-Pump Gain-Shifted Thulium-Doped Fiber Amplifier." Alcatel Research & Innovations. PD2-1.

* cited by examiner

DUAL-WAVELENGTH PUMPED THULIUM-DOPED OPTICAL FIBER AMPLIFIER

CROSS-REFERENCE TO RELATED APPLICATIONS

This patent application claims priority from and incorporates by reference the entire disclosure of U.S. Provisional Patent Application No. 60/363,438, which was filed on Mar. 11, 2002. This patent application also claims priority from and incorporates by reference the entire disclosure of U.S. Provisional Patent Application No. 60/365,133, which was filed on Mar. 14, 2002.

FIELD OF THE INVENTION

The present invention relates generally to the field of optical communication and particularly to an optical thulium doped fiber amplifier utilizing a dual wavelength pumping scheme for amplifying an optical signal.

BACKGROUND OF THE INVENTION

The widespread and increasing use of fiber optics for communication purposes has brought considerable attention to means for increasing the communication capacity of the fibers. The use of Wavelength Division Multiplexing (WDM) signals is an effective way of increasing transmission capacity, since a plurality of separated wavelength bands, each band capable of transmitting signals, is simultaneously used in a fiber.

Optical amplifiers are used to compensate for the fiber link and splitting losses within optical communication systems. The WDM technique requires amplification in a broad wavelength spectrum, which is typically realized by letting a plurality of optical amplifiers, each operational in a part of the wavelength spectrum, operate in parallel. Various rare-earth doped optical amplifiers, in the form of amplification fibers, suitable for WDM are known in the art. The optical fiber amplifier typically consists of an optical material such as glass, combined with a rare earth dopant and configured as an optical waveguide. Rare-earth-doped silica fibers are popular today, in part because they offer the advantages of single-mode guided wave optics. Optical fiber amplifiers can be made to operate over a broad range of wavelengths, dictated by the atomic properties of the host and rare earth dopant. In their basic operation pump light from a pump source is used to excite the dopant atoms in the amplification fiber from a ground state to a metastable state. The excited atoms are, by an incident signal of a characteristic wavelength, stimulated to emit energy in form of a light of the same wavelength, the emission resulting in an amplification of the signal. The process is known as stimulated emission. After the stimulated emission the atom is in a termination state. The gain should be high, the efficiency too. The gain of the amplifier, defined as the power of the signal out divided by the power of the signal in, should be as high as possible. Also, the efficiency of the amplifier, measured as the gain achieved for a particular pump power, should be as high as possible. In addition the gain should preferably be essentially flat, i.e. not depending on the frequency of the incident light, over the frequency range in which the amplifier is intended to be used.

For amplification in the so called S-band (1450–1520 nm) much interest has been given to thulium doped fiber amplifiers (TDFA). The useful transition for the stimulated emission is between the metastable $^3H_4$ level to the lower $^3F_4$ termination level, giving an output signal of wavelength around 1470 nm. A well recognized problem with using TDFA as an optical amplifier is that the $^3H_4$ level has a short lifetime compared to the $^3F_4$ level. In practice this results in that, even if the pumping excitation to the $^3H_4$ level is successfully achieved, the stimulated emission will be impaired due to the accumulation of population at the $^3F_4$ level. This results in a poor gain.

Several attempts for increasing the gain of the TDFA have been reported, including up-conversion pumping with repeated pumping with the same wavelength and various dual wavelength pumping schemes as for example presented in the following: F. Roy, D. Bayart, A. Le Sauze and P. Baniel, "Noise and gain band management of thulium-doped fiber amplifier with dual-wavelength pumping schemes," IEEE Photon. Technol. Lett., 13, 788–790, (2001); T. Kasamatsu, Y. Yano and H. Sekita, "1.50-µm-band gain-shifted thulium-doped fiber amplifier with 1.05- and 1.56-µm dual-wavelength pumping," Opt. Lett., 24, 1684–1686, (1999); T. Kasamatsu, Y. Yano and T. Ono, "Laser-diode pumping (1.4 and 1.56 µm) of gain-shifted thulium-doped fiber amplifier," Electron. Lett., 36, 1607–1609, (2000); T. Kasamatsu, Y. Yano, and T. Ono, "Gain-shifted dual-wavelength-pumped thulium-doped fiber amplifier for WDM signals in the 1.48–1.51-µm wavelength region," IEEE Photon. Technol. Lett., 13, 31–33, 2001; F Roy, F. Leplingard, L. Lorcy, A. Le Sauze, P Baniel,. D. Bayart, "48% power conversion efficiency in single pump gain-shifted thulium-doped fibre amplifier". Electronics Letters, 37:15, 943–945, 2001; T. Kasamatsu, Y. Yano, T. Ono, "Laser-diode-pumped highly efficient gain-shifted thulium-doped fiber amplifier operating in the 1480–1510-nm band", IEEE Photonics Technology Letters, 13:5, 433–435, 2001; Tadashi Sakamoto, "S-band fiber optic amplifiers", Optical Fiber Communication Conference and Exhibit, 2 TuQ1-1–TuQ1-4, 2001; B. Cole, M. L. Dennis, "S-band amplification in a thulium doped silicate fiber" Optical Fiber Communication Conference and Exhibit, 2, TuQ3-1–TuQ3-3, 2001; T. Kasamatsu, Y. Yano, T. Ono, "Laser-diode-pumped highly-efficient gain-shifted thulium doped fiber amplifier operating in the 1480–1510-nm band" Optical Fiber Communication Conference and Exhibit, 2, TuQ4-1–TuQ4-3, 2001; F. Roy, P. Baniel, C. Fages, J. J. Girard, A. Le Sauze, D. Bayart, "Optimal pumping schemes for gain-band management of thulium-doped fiber amplifiers", Optical Fiber Communication Conference and Exhibit, 2, TuQ7-1–TuQ7-4, 2001; F. Roy, F. Leplingard, L. Lorcy, A. Le Sauze, P. Baniel, D. Bayart, "48% power conversion efficiency in a single-pump gain-shifted thulium-doped fiber amplifier", Optical Fiber Communication Conference and Exhibit, PD2_1–PD2_3, 2001; F. Roy, D. Bayart, P. Baniel, and "Novel pumping schemes for thulium doped fiber amplifier" Optical Fiber Communication Conference, 2, 14–16, 2000.

In the dual wavelength pumping process, the first photon populates the lower $^3F_4$ level whereas the second photon is responsible for populating the higher $^3H_4$ level and at the same time depopulating the $^3F_4$ (lower) level to allow for population inversion. The reported wavelengths have been 1050–1550 nm for the first pumping and around 1400 for the second pumping and typically a total pump power of 200–500 mW are needed to reach a 27 dB gain.

Disclosed in U.S. Pat. No. 6,407,853 is a dual pumping scheme suitable for TDFA. A first pumping wavelength of preferably 800 nm excite the dopant from the ground level ($^3H_6$) directly to the $^3H_4$ level. A second pumping wavelength of 1440 nm is used to depopulate the $^3F_4$ level and hence facilitating the stimulated emission.

The prior art represent significant improvements in the use of thulium doped fiber amplifiers. However, for widespread use in communication systems it is necessary to further increase the efficiency of the amplifiers as well as to use pump wavelengths which are achievable with low cost semiconductor lasers.

SUMMARY OF THE INVENTION

The objective problem is to provide a method and an apparatus for amplifying an optical signal with a high gain and with high power efficiency as to facilitate production of effective optical amplifiers at reasonable costs.

A method of amplifying an optical signal in a thulium doped fiber amplifier according to principles of the invention includes the steps of: a first deposition of energy into the fiber amplifier by pumping with radiation of a first wavelength; and a second deposition of energy into the fiber amplifier by pumping with radiation of a second wavelength. The radiation of the first wavelength is arranged to induce, by single photon absorption, a population to the $^3H_4$ level of the thulium dopant, and the radiation of the second wavelength primarily depopulates the $^3F_4$ level, by excited absorption of a single photon, preferably by strong excited state absorption to the $^3F_2$ level. These steps achieve a population inversion between the $^3H_4$ and the $^3F_4$ levels and facilitate a power efficient high gain amplification.

An amplifying assembly for amplifying an optical signal in a thulium doped fiber amplifier according to principles of the invention comprises: a first energy depositing means for depositing energy into the fiber amplifier by pumping with radiation of a first wavelength, and a second energy depositing means for depositing energy into the fiber amplifier by pumping with radiation of a second wavelength. The radiation of the first wavelength is arranged to induce, by single photon absorption, a population to the $^3H_4$ level of the thulium dopant, and the radiation of the second wavelength primarily depopulates the $^3F_4$ level, by excited absorption of a single photon, preferably by strong excited state absorption to the $^3F_2$ level, whereby achieving a population inversion between the $^3H_4$ and the $^3F_4$ levels.

One advantage afforded by the arrangement and method according to the invention is that a high amplification gain is achieved using relatively low power.

Another advantage afforded by the invention is that low cost laser diodes may be used.

A main advantage by the arrangement and method according to the invention is that low cost, yet effective, and hence commercially attractive, optical amplifiers may be produced.

BRIEF DESCRIPTION OF THE FIGURES

Features and advantages of the present invention outlined above are described more fully below in the detailed description in conjunction with the drawings where like reference numerals refer to like elements throughout, in which.

DETAILED DESCRIPTION OF THE INVENTION

Embodiments of the invention will now be described with reference to the figures.

Figure 1A:
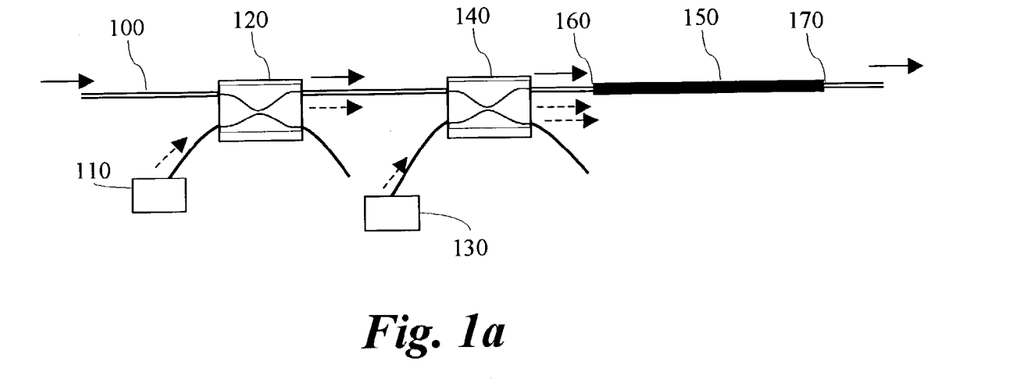
FIG. 1a-c are schematic drawings of a dual wavelength pumping assemblies according to the invention.
Figure 1B:
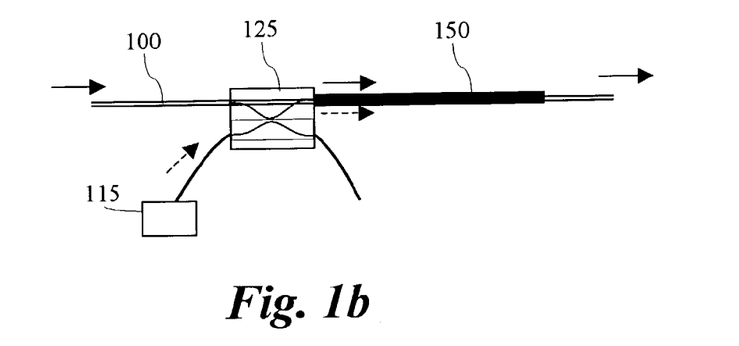
Figure 1C:
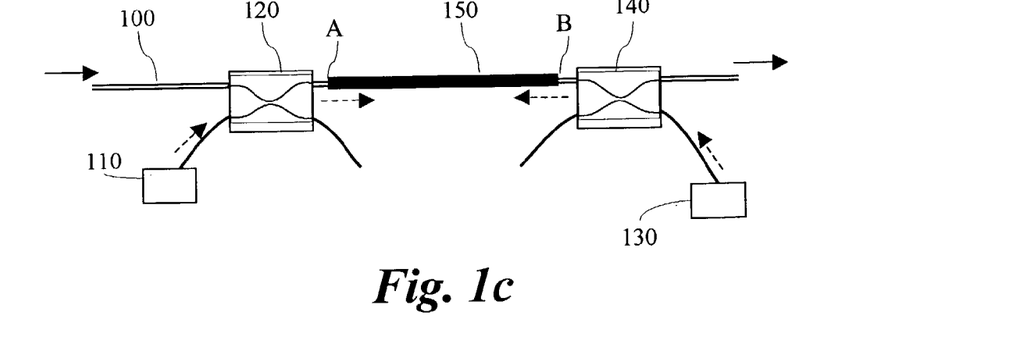

In FIG. 1a the principle setup of a dual pumping optical amplifier is schematically illustrated. The signal in the S-band, typically of wavelength 1470 nm is carried in the signal medium 100, for example an optical fiber. A first pumping device 110, with a first pumping wavelength $\lambda_{p1}$, is optically coupled to the signal medium 100, for example through a first WDM fiber coupler unit 120. A second pumping wavelength, $\lambda_{p2}$, is produced by a second pumping device 130, which is optically coupled to the signal medium 100, for example through a second WDM fiber coupler unit 140. The stimulated emission of photons, i.e. the amplification takes place in the amplifier fiber 150 of thulium doped material. The amplifier fiber has an input 160 for receiving the input signal and the co-propagating photons from the pumping devices, and an output 170 for the amplified optical signal. In FIG. 1a-c the solid arrows indicate the direction of the signal and the dashed arrows the direction of the pumping light. As realized by the skilled in the art an amplifying assembly may be realized in a large variety of ways.

FIG. 1b schematically illustrates one common alternative way of coupling the signal and the pump light to the amplifying fiber. A WDM fiber coupler unit 125 is used to couple the pumping light produced by a pumping device 115 and the signal carried in the signal medium 100 directly to the amplifier fiber 150. Hence, the WDM fiber coupler unit is itself the place were the signal and the pumping light are coupled to the amplifying fiber.

Alternatively, the pumping light may be coupled counter-propagating with the signal to be amplified, or split so that one pump wavelength co-propagates and the other pump wavelength counter-propagates with the signal. Such a amplifying setup is schematically illustrated in FIG. 1c. The signal in the S-band, typically of wavelength 1470 nm is carried in the signal medium 100. The first pumping wavelength $\lambda_{p1}$, is produced by the first pumping device 110. The first WDM fiber coupler unit 120 couples the first pumping wavelength and the signal to one end of the amplifying fiber 150. The second WDM fiber coupler unit 140 couples the second pumping wavelength, $\lambda_{p2}$, produced by a second pumping device 130, to the other end of the amplifying fiber 150. The second WDM fiber coupler unit 140 also provides an output 175 for the amplified signal. This setup may be advantageous to separate the remaining pump light from the amplified signal. The WDM fiber coupler unit associated with one wavelength also helps removing light of the other wavelength which was not absorbed by the amplifying fiber.

The light of different wavelength produced in the pumping devices 110, 130 may originate from various commercially available light sources including, fiber lasers, tunable lasers and laser diodes. For commercial applications, then the price and reliability is of high importance, the laser diodes are particularly interesting. Laser diodes producing light of suitable wavelength are commercially available.

Embodiments of amplifying assemblies carrying out the method of the invention will be given below.

The method according to the invention, the dual wavelength pumping scheme will be described with references to FIG. 2, which illustrates the energy levels of thulium doped fiber amplifier. The first pumping wavelength, $\lambda_{p1}$, according to the invention should preferably be around 800 nm followed by the second pumping wavelength, $\lambda_{p2}$, preferably of around 1050 nm or 980 nm. The choice of wavelengths has been shown to, compared to prior art pumping schemes, give a surprisingly good result as regards to gain, frequency dependence and amplification.

Figure 2:
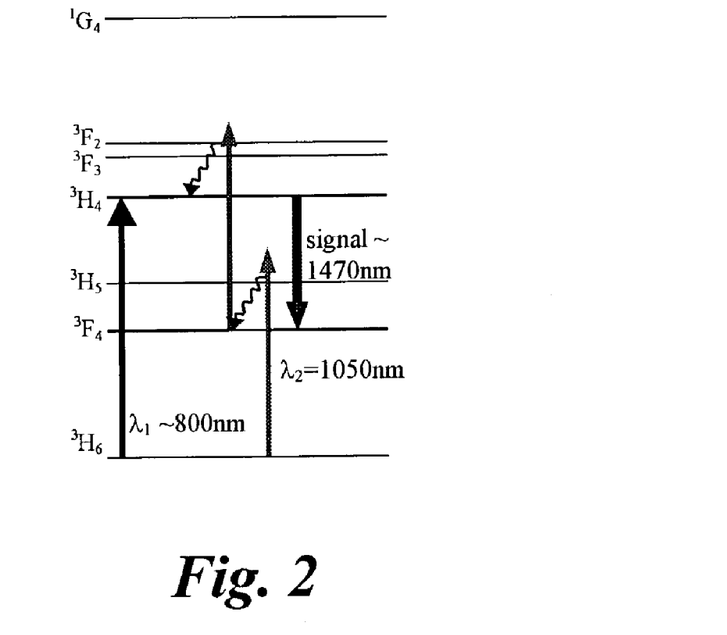
FIG. 2 is a schematic illustration of relevant energy levels and transitions in a Tm dopant atom.

The main advantage of the scheme according to the invention relies on the fact that the $\lambda_{p1} \sim 800$ nm pump wavelength populates the upper amplifying level $^3H_4$ by single photon absorption, as indicated in FIG. 2. The absorption cross section is high (see table I below), ensuring an effective utilization of the pumping power. The second wavelength, $\lambda_{p2}$, helps primarily to depopulate the lower level $^3F_4$, by excited absorption of a single photon. The transition given by $\lambda_{p2} \sim 1050$ nm, by strong excited state absorption (ESA) to level $^3F_2$, occurs with a high probability (see cross section in table I). It also simultaneously populates the level $^3H_4$ (through $^3F_2$), both effects beneficial to creating the population inversion. As is well known, 1050 nm pumping alone is useful to provide amplification but at the expense of high power due to the very low ground state absorption (GSA) to level $^3F_4$ through $^3H_5$, whose cross section should not differ much from the 1064 nm cross section shown in table I. The use of $\lambda_{p2} \sim 980$ nm, which represent an alternative embodiment of the invention, results in a population inversion, but is slightly less effective. However, to use $\lambda_{p2} \sim 980$ nm might be commercially attractive as powerful and cheap laser diodes giving 980 nm are available.

TABLE I

Cross Section for several transitions in Thulium doped ZBLAN fibers

| Transition and wavelength | Cross section ($\sigma$) - pm$^2$ | Description | Ref |
|---|---|---|---|
| $^3H_6 \to {}^3H_4$ at 790 nm | 0.33 ± 0.01 | Absorption (GSA) | [2] |
| $^3H_6 \to {}^3H_5$ at 1064 nm | 0.0011 | Absorption (GSA) - estimated | [1], [3] |
| $^3F_4 \to {}^3F_2$ at 1055 nm (peak) | 1.2 | Absorption (ESA) - estimated | [1], [3] |
| $^3F_4 \to {}^3F_2$ at 1064 nm | 0.82 | Absorption (ESA) - estimated | [1], [3] |
| $^3H_4 \to {}^3F_4$ at 1469 nm | 0.67 | Stimulated-emission | [1] |

Figure 3:
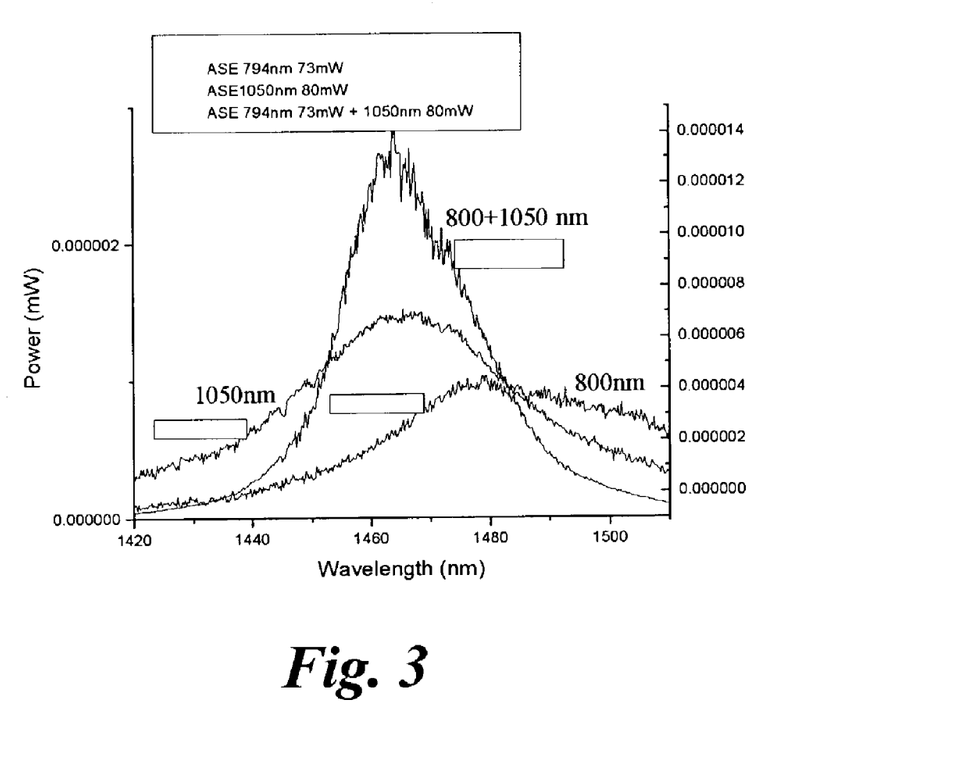
FIG. 3 is a graph showing the amplified spontaneous emission of thulium using the method of the invention.

The advantages of the inventive pumping scheme is illustrated in FIG. 3 in which the ~1470 nm amplified spontaneous emission (ASE) band when pumped by each individual wavelength, $\lambda_{p1}$, and $\lambda_{p2}$ respectively, and both wavelengths together. From FIG. 3 the dramatic increase in ASE power when the two wavelengths are used together, compared to when each one pumps the TDFA individually, should be evident. The advantages of the present invention is further illustrated in FIG. 4, which in a graph illustrates the gain and noise figure for the inventive dual pumping scheme. The enhancement in the small signal gain when the ~800 nm wavelength is added to the 1050 nm pump (filled squares in the figure) is striking.

Figure 4:
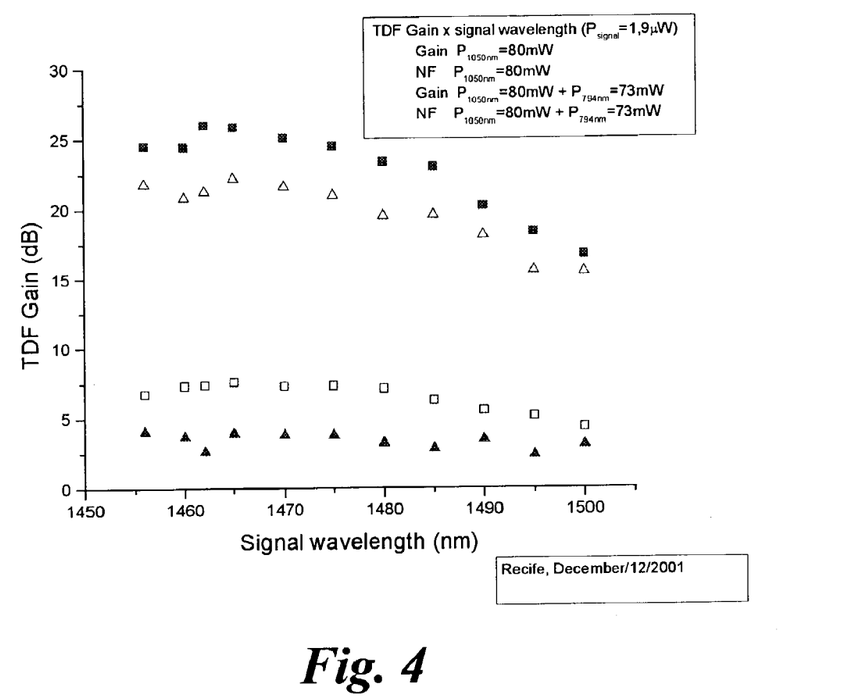
FIG. 4 is a graph showing the gain using the method of the invention.

It is worth noting that the ~800 nm pump alone does not suffice to create a population inversion, whereas the 1050 nm pump alone does. However, for the pump power at 1050 nm employed, a very small gain (all gains described here are internal, i.e., fiber gain) approximately 7–8 dB is obtained (unfilled squares). Previous measurements on this fiber have shown that gains of over 20 dB can be obtained with pumping at 1050 nm alone, but for very high powers (over 300 mW). In our dual wavelength pumped TDFA, for a total of 153 mW pump power, a gain of more than 20 dB over a bandwidth of approximately 40 nm was obtained. A noise figure (filled triangles) of less than 5 dB was measured for the dual pumping, which is close to the expected limit of 3 dB for TDFA's. The gain may be further optimized by adjusting the pumping power of the two wavelengths. For example, a gain of 27 dB was obtained for a total pump power of 180 mW (100 mW of 1050 nm and 80 mW of 794 nm). Optimization of the TDFA in terms of gain and gain flatness can be obtained by adjusting the Thulium ion concentration, the doped fiber length, and the exact wavelength and power of the two pumps. The wavelengths are typically and preferably within $\lambda_{p1} \sim 800$ nm±10 nm and $\lambda_{p2} \sim 1055$ nm±10 nm, respectively or alternatively $\lambda_{p1} \sim 800$ nm ±10 nm and $\lambda_{p2} \sim 980$ nm±10 nm, respectively.

The pumping method according to the invention may be summarized in the following main steps:

(a) a first deposition of energy into the fiber amplifier by pumping with radiation of a first wavelength which, by single photon absorption, induces a population to the $^3H_4$ level of the thulium dopant. The first wavelength is preferably 800 nm±10 nm.

(b) a second deposition of energy into the fiber amplifier by pumping with radiation of a second wavelength which depopulates the $^3F_4$ level, by excited absorption of a single photon, preferably by strong excited state absorption to the $^3F_2$ level. In addition the radiation of the second wavelength simultaneously populates the $^3H_4$ level through the $^3F_2$ level. The second wavelength is preferably 1055 nm±10 nm or alternatively 980 nm±10 nm.

The two main steps achieving an population inversion between the $^3H_4$ and the $^3F_4$ levels, and hence a significant increase in gain and amplification.

As an example of implementation, and the setup utilized for the above presented results, a diode-pumped Yb-fiber laser operating at 1050 nm can be used for $\lambda_{p2}$. For the other pump source at $\lambda_{p1} \sim 800$ nm, a Ti-sapphire tunable cw laser can be used. A cw semiconductor diode laser represents a lower cost alternative. A single channel test signal may be provided by a cw tunable laser diode source, but WDM operation is also feasible. Thulium doped fibers are commercially available, for example from Le Verre Fluoré. Typical characteristics for a so called ZBLAN (ZrF$_4$—BaF$_2$—LaF$_3$—AlF$_3$—NaF) fiber suitable for the inventive method is presented in table II.

TABLE II

Characteristics of a Thulium doped ZBLAN fiber.

| | Fiber #1 (from Le Verre Fluoré) |
|---|---|
| Fiber Type | Single mode |
| Fiber composition | ZrF$_4$—BaF$_2$—LaF$_3$—AlF$_3$—NaF |
| Fiber identification | 011010/28671 |
| Pigtail fiber* | Standard Silica Fiber |
| Dopant | Tm$^{3+}$ |
| Doping Concentration | 2000 ppm molar |
| NA | 0.24 |
| Cutoff wavelength | 880 nm |
| Core diameter | 2.8 µm |
| Clad diameter | 125 µm |
| Fiber length | 15 m |

The above described ZBLAN fiber should be considered as a non limiting example. Many of the material parameters may be varied and the material could still serve as the gain material in an optical amplifier. Some of the parameters may even be varied to optimize the performance of the amplifying assembly, for example the Tm doping concentration. The Tm doping concentration is typically 2000 ppm, but other concentrations display promising results, particularly higher concentrations. Even Tm doping concentrations around 5000 ppm could be advantageous to use in combination with the pumping scheme according to the invention.

Many commercially used optical fibers are based on silica glass, which is stable even at high temperatures and can be spliced with available machines with very low loss. At present, silica fibers are not compatible with Tm-amplifiers in the S-band because of phonon scattering. Therefore, fibers based on fluoride materials such as ZBLAN are used. Other types of fiber materials are constantly developed, tested and used, for example the, Telluride fibers. Developments in the area will most probably lead to the use of silica or silica-compatible fibers in the near future. As appreciated by the skilled in the art the pumping scheme according to the present invention could advantageously be used with all these types of fibers, including the silica based ones.

The pumping scheme according to the invention is not limited to the above described amplifying assembly. On the contrary, a large variety of assemblies may advantageously use the aforementioned pumping scheme. It may, e.g. also be used inside an optical cavity, so that a laser is embodied. The active ions can be incorporated in an optical fiber, as will be further described below. They can also be incorporated in a crystal, such as those used in the so-called microchip lasers. The pumping scheme described above is equally useful to provide optical excitation to the Tm laser. The large bandwidth intrinsic to the ion results in a potentially widely tunable laser. The Tm doped material can be used for the purpose of lasing in the 1.4–1.52 μm wavelength region.

Figure 5:
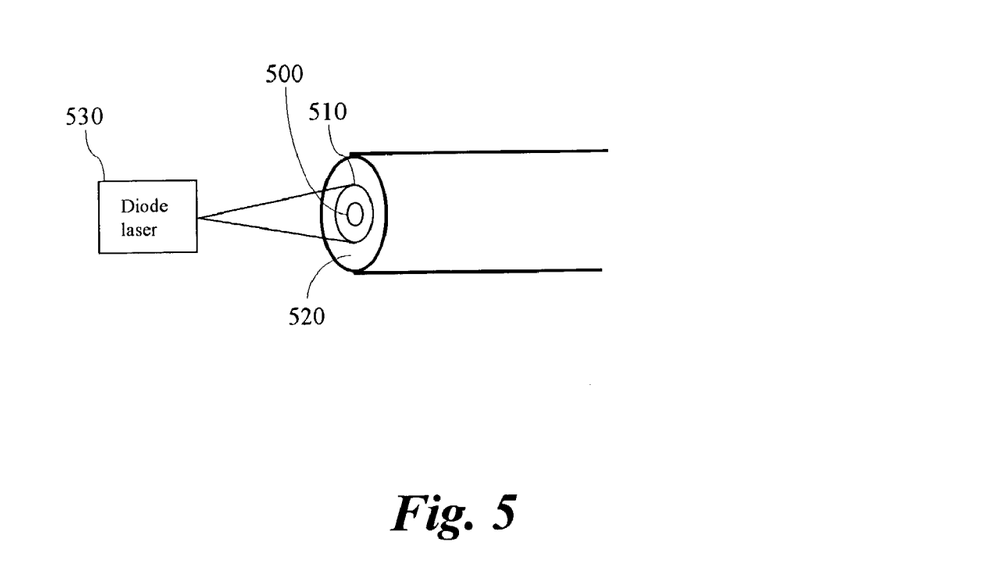
FIG. 5 is a schematic drawing of an embodiment of the invention.

One embodiment of the invention will be described with references to FIG. 5 in which the doped material is a single mode optical fiber with Tm ions in the core 500 and neodymium (Nd) ions in an inner cladding 510, surrounded by an outer cladding 520. In this embodiment, only a 800 nm light source is required for external pumping, for example a semiconductor diode laser 530. The Nd ions contained in the inner cladding of the fiber absorb some of the photons at 800 nm and emit radiation in the 1050 nm region, which is in turn absorbed in the single core by the Tm ions. The inner cladding configuration has the advantage of helping making most use of the poorly collimated radiation from a semiconductor diode laser at 800 nm, since the effective area of the inner cladding is much greater than of the single mode core of the fiber.

Figure 6:
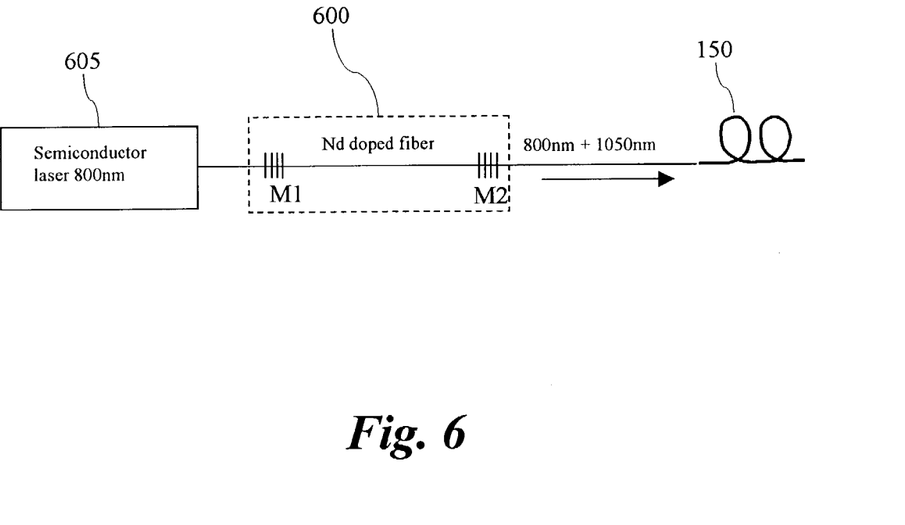
FIG. 6 is a schematic drawing of an embodiment of the invention.

One way of depositing the energy to the rare earth doped material according to the invention is to utilize in radiation from the semiconductor lasers for pumping a fiber laser and also the Tm-doped fiber. This embodiment is schematically illustrated in FIG. 6, in which a fiber laser is provided with an optical cavity 600 where the Nd-doped fiber providing optical gain is placed between two fiber Bragg gratings M1 and M2, respectively. A semiconductor laser 605 provide the 800 nm which drives the fiber laser. The optical cavity is coupled to the Tm-doped fiber amplifier 150. The gratings may be made on the same piece of Nd-doped fiber, or on pieces of fiber that are subsequently spliced to the Nd-doped fiber. The wavelengths reflected by the Bragg gratings are close to 1050–1060 nm, so that the fiber laser reaches threshold. The reflectivity of the mirror M1 can be preferentially close to 100% at the lasing wavelength (1.06 μm) and close to 0% at the pumping wavelength (800 nm). The reflectivity of grating M2 should be less than 100% at the lasing wavelength and close to 0% at the pumping wavelength. In this way, the radiation reaching the Tm-doped fiber in the fiber amplifier 150 is the sum of the fiber-laser light and the fraction of the 800 nm pump light that has not been absorbed by the Nd-doped fiber.

Figure 7:
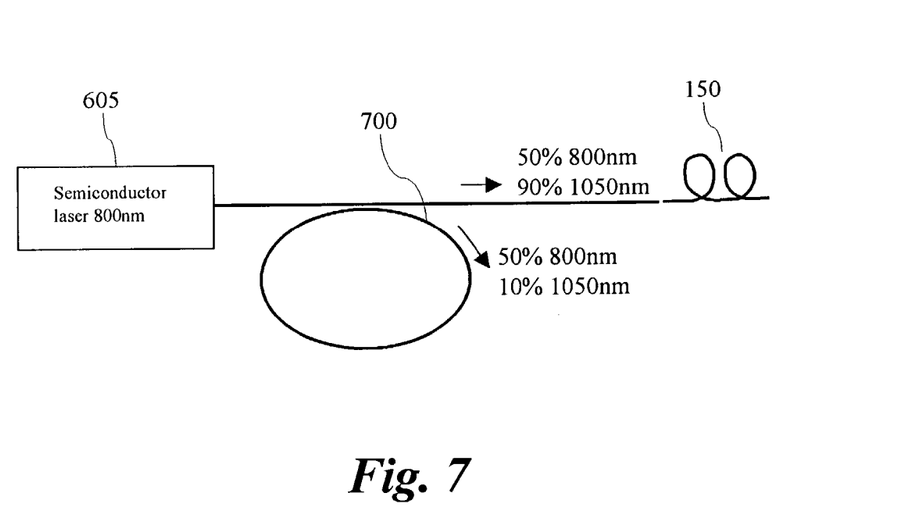
FIG. 7 is a schematic drawing of an embodiment of the invention.

In an alternative embodiment, schematically depicted in FIG. 7, the fiber laser is realized by a ring configuration of Nd-doped fiber 700 driven by a semiconductor diode laser providing 800 nm radiation. A small part (around 10%) of the radiation generated at 1050 nm in the ring laser would be circulated to keep the laser above threshold, while most of the radiation available at 1050 nm would be used for pumping the Tm-fiber. The numbers given should be regarded as a non limiting example to explain the principle of operation.

In order to reduce the length of Tm-doped fiber required for maximum gain, it is possible to propagate the pump light along the Tm-doped fiber, and then to reflect the remaining part of the pump light that was not absorbed. The mirrors to be used can be preferentially fiber Bragg gratings, that can conveniently be highly reflective at the pump wavelengths (800 nm and 1050 nm), and highly transmitting at the signal wavelengths to be amplified. The gratings could be incorporated in a piece of silica based fiber that is connected to the Tm-doped fluor-based fiber and constitutes the output fiber of the amplifier. Referring to the schematically illustrated setup of FIG. 1c the Bragg gratings may be provided at or close to the endpoints of the amplifying fiber, denoted with A and B, respectively. The Bragg gratings are arranged to reflect back the wavelengths 1050 nm and 800 nm, respectively.

It should be understood that the idea here disclosed is not exclusive of other techniques known in the prior art to improve the performance of rare-earth doped amplifiers. For example, the use of gain equalizing filters such as fiber Bragg gratings is clearly a possibility in conjunction with the pumping scheme disclosed in the present invention. Here, the filters could be conveniently placed at the output of the amplifier. In this way, the Bragg grating can be fabricated in the output fiber, for example a silica-based fiber.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of amplifying an optical signal in a thulium doped fiber amplifier comprising the steps of:
   a first deposition of energy into the fiber amplifier by pumping with radiation of a first wavelength;
   a second deposition of energy into the fiber amplifier by pumping with radiation of a second wavelength;
   wherein the radiation of the first wavelength by single photon absorption populates the $^3H_4$ level of the thulium dopant, and the radiation of the second wavelength depopulates the $^3F_4$ level by strong excited state absorption of a single photon to the $^3F_2$ level; and
   wherein the radiation of the second wavelength simultaneously populates the $^3H_4$ level through the $^3F_2$ level, whereby achieving a population inversion between the $^3H_4$ and the $^3F_4$ levels.

2. The optical amplifying method according to claim 1 wherein the radiation of the first wavelength has a wavelength of around 800 nm.

3. The optical amplifying method according to claim 2, wherein the radiation of the first wavelength has a wavelength of 800×10 nm.

4. The optical amplifying method according to claim 1, wherein the radiation of the second wavelength has a wavelength of around 1050 nm.

5. The optical amplifying method according to claim 4, wherein the radiation of the second wavelength has a wavelength of around 1050±10 nm.

6. The optical amplifying method according to claim 1, wherein the radiation of the second wavelength has a wavelength of around 980 nm.

7. The optical amplifying method according to claim 6, wherein the radiation of the second wavelength has a wavelength of around 980±10 nm.

8. The optical amplifying method according to claim 1, further comprising the step of reflecting at least one of the radiations of the first and second wavelengths by a at least one Bragg grating, whereby facilitating a reduction of length of the thulium doped fiber amplifier without essentially affecting the amplification gain.

9. The optical amplifying method according to claim 1, wherein the radiation of the first or second wavelength is generated from the radiation of the second or first wavelength, respectively.

10. The optical amplifying method according to claim 9, wherein the radiation of the first or second wavelength is generated in an optically amplifying material incorporated in an amplifying assembly, the generation of radiation of the first or second wavelength thus induced by the radiation of the second or first wavelength, respectively.

11. An amplifying assembly for amplifying an optical signal in a thulium doped fiber amplifier comprising:
    a first energy depositing means for depositing energy into the fiber amplifier by pumping with radiation of a first wavelength;
    a second energy depositing means for depositing energy into the fiber amplifier by pumping with radiation of a second wavelength; and
    wherein the radiation of the first wavelength by single photon absorption populates the $^3H_4$ level of the thulium dopant, and the radiation of the second wavelength primarily depopulates the $^3F_4$ level by strong excited state absorption of a single photon to the $^3F_2$ level and simultaneously populates the $^3H_4$ level through the $^3F_2$ level, whereby achieving a population inversion between the $^3H_4$ and the $^3F_4$ levels.

12. The amplifying assembly according to claim 11, wherein the radiation of the first wavelength has a wavelength of around 800 nm.

13. The amplifying assembly according to claim 12, wherein the radiation of the first wavelength has a wavelength of 800±10 nm.

14. The amplifying assembly according to claim 11, wherein the radiation of the second wavelength has a wavelength of around 1050 nm.

15. The amplifying assembly according to claim 14, wherein the radiation of the second wavelength has a wavelength of around 1050±10 nm.

16. The amplifying assembly according to claim 14, wherein the radiation of the second wavelength has a wavelength of around 980±10 nm.

17. The amplifying assembly according to claim 11, wherein the radiation of the second wavelength has a wavelength of around 980 nm.

18. The amplifying assembly according to claim 11, wherein the radiation of the first and/or second wavelength is produced by laser diodes.

19. The amplifying assembly according to claim 11, wherein the radiation of the first or second wavelength is generated from the radiation of the second or first wavelength, respectively.

20. The amplifying assembly according to claim 19, further comprising means for generating radiation incorporated in the amplifying assembly, wherein the radiation of the first or second wavelength is generated by the means for generating radiation using the radiation of the second or first wavelength, respectively.

21. The amplifying assembly according to claim 20, wherein the means for generating radiation is provided as a core of thulium doped fiber surrounded by a cladding comprising neodymium (Nd) ions and adopted to absorb some of the radiation at the first wavelength and emit radiation at the second wavelength.

22. The amplifying assembly according to claim 20, wherein the means for generating radiation is a fiber laser driven by the radiation of the first wavelength.

23. The amplifying assembly according to claim 22, wherein the fiber laser is a ring configuration of neodymium (Nd)-doped fiber driven by a semiconductor diode laser providing radiation of the first wavelength.

24. The amplifying assembly according to claim 22, wherein the fiber laser comprises an optical cavity in which a neodymium (Nd)-doped fiber is placed between two fiber Bragg gratings.

25. The amplifying assembly according to claim 11, further comprising at least one Bragg grating adapted for reflecting at least one of the radiation of the first and second wavelengths by, whereby facilitating a reduction of length of the thulium doped fiber amplifier without essentially affecting an amplification gain.

* * * * *

UNITED STATES PATENT AND TRADEMARK OFFICE
CERTIFICATE OF CORRECTION

| | | |
|---|---|---|
| PATENT NO. | : 7,113,328 B2 | Page 1 of 1 |
| APPLICATION NO. | : 10/385876 | |
| DATED | : September 26, 2006 | |
| INVENTOR(S) | : Gomes et al. | |

It is certified that error appears in the above-identified patent and that said Letters Patent is hereby corrected as shown below:

On The Title Page, Item (56), under "U.S. PATENT DOCUMENTS", in Column 2, Line 8, delete "6,628,883 B1" and insert -- 6,628,883 B2 --, therefor.

On The Title Page, Item (56), under "U.S. PATENT DOCUMENTS", in Column 2, Line 9, delete "6,667,257 B1" and insert -- 6,667,257 B2 --, therefor.

On The Title Page, Item (56), under "U.S. PATENT DOCUMENTS", in Column 2, Line 10, delete "6,721,092 B1" and insert -- 6,721,092 B2 --, therefor.

On The Title Page, Item (56), under "U.S. PATENT DOCUMENTS", in Column 2, Line 11, delete "6,924,928 B1" and insert -- 6,924,928 B2 --, therefor.

In Column 9, Line 6, in Claim 3, delete "800x10" and insert -- 800±10 --, therefor.

Signed and Sealed this

Eighteenth Day of December, 2007

JON W. DUDAS
*Director of the United States Patent and Trademark Office*